US011349562B2

(12) United States Patent
Stavridis et al.

(10) Patent No.: US 11,349,562 B2
(45) Date of Patent: May 31, 2022

(54) DETERMINING A CHANNEL ESTIMATE

(71) Applicant: Telefonaktiebolaget LM Ericsson (publ), Stockholm (SE)

(72) Inventors: Athanasios Stavridis, Malmö (SE); Leif Wilhelmsson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/283,097

(22) PCT Filed: Oct. 8, 2018

(86) PCT No.: PCT/EP2018/077289
§ 371 (c)(1),
(2) Date: Apr. 6, 2021

(87) PCT Pub. No.: WO2020/074056
PCT Pub. Date: Apr. 16, 2020

(65) Prior Publication Data
US 2021/0384970 A1  Dec. 9, 2021

(51) Int. Cl.
*H04B 10/07* (2013.01)
*H04B 10/116* (2013.01)
*H04L 25/02* (2006.01)

(52) U.S. Cl.
CPC .......... *H04B 10/07* (2013.01); *H04B 10/116* (2013.01); *H04L 25/022* (2013.01)

(58) Field of Classification Search
CPC ............................ H04B 10/07; H04B 10/116
(Continued)

(56) References Cited

U.S. PATENT DOCUMENTS 6,937,642 B2   8/2005  Hirata
7,251,272 B2   7/2007  Futagi et al.
(Continued)

FOREIGN PATENT DOCUMENTS

JP   2001326586 A   11/2001
JP   2002077004 A   3/2002
(Continued)

OTHER PUBLICATIONS

Carruthers et al., "Propagation modeling for indoor optical wireless communications using fast multi-receiver channel estimation", Oct. 17, 2003, IEE Proceedings: Optoelectron, Institute of Electrical Engineers, Stevanage, GB, vol. 150, No. 5, pp. 473-481, XP006024255, ISSN: 1350-2433 (Year: 2003).*

(Continued)

*Primary Examiner* — Dalzid E Singh
(74) *Attorney, Agent, or Firm* — Coats & Bennett, PLLC

(57) ABSTRACT

In one example aspect, a method of determining a channel estimate of an optical communications channel between at least one optical transmitting component and at least one optical receiving component is provided, the method comprising determining a location of at least one optical transmitting component, determining an orientation of the at least one optical transmitting component, determining a transmission characteristic of the at least one optical transmitting component, determining a location of at least one optical receiving component, determining an orientation of the at least one optical receiving component, determining a reception characteristic of the at least one optical receiving component, and calculating the channel estimate of the optical communications channel based on the location of the at least one optical transmitting component, the orientation of the at least one optical transmitting component, the transmission characteristic of the at least one optical trans- (Continued)

mitting component, the location of the at least one optical receiving component, the orientation of the at least one optical receiving component and the reception characteristic of at least one optical receiving component.

15 Claims, 2 Drawing Sheets

(58) Field of Classification Search
USPC .......................................................... 395/25
See application file for complete search history.

(56) References Cited

U.S. PATENT DOCUMENTS

| 10,284,293 | B2* | 5/2019 | Bitra | .......................... G01S 5/16 |
| 10,495,467 | B2* | 12/2019 | Wang | .................... H04B 10/116 |
| 2019/0104373 | A1* | 4/2019 | Wodrich | ................. G06F 3/165 |
| 2019/0312685 | A1 | 10/2019 | Zhou | |

FOREIGN PATENT DOCUMENTS

| RU | 2536769 | C2 | 12/2014 |
| WO | 2007008574 | A2 | 1/2007 |
| WO | 2008098223 | A2 | 8/2008 |
| WO | 2009036214 | A1 | 3/2009 |
| WO | 2012109248 | A1 | 8/2012 |
| WO | 2018086121 | A1 | 5/2018 |

OTHER PUBLICATIONS

Carruthers, J. et al., "Propagation Modelling for Indoor Optical Wireless Communications Using Fast Multi-Receiver Channel Estimation", IEE Proceedings—Optoelectronics, vol. 150 No. 5, Oct. 1, 2003, pp. 473-481, IEE.

Behlouli, A. et al., "Impact of Physical and Geometrical Parameters on Visible Light Communication Links", 2017 Advances in Wireless and Optical Communications, Nov. 3, 2017, pp. 73-78, IEEE.

Komine, T. et al., "Fundamental Analysis for Visible-Light Communication System Using LED Lights", IEEE Transactions on Consumer Electronics, vol. 50 No. 1, Feb. 1, 2004, pp. 100-107, IEEE.

Grobe, L. et al., "Block-Based PAM with Frequency Domain Equalization in Visible Light Communications", Globecom 2013 Workshop—Optical Wireless Communications, Jan. 1, 2013, pp. 1070-1075, IEEE.

Tsonev, D. et al., "Complete Modeling of Nonlinear Distortion in OFDM-Based Optical Wireless Communication", Journal of Lightwave Technology, vol. 31 No. 18, Sep. 15, 2013, pp. 3064-3076, IEEE.

Li, L. et al., "Epsilon: A Visible Light Based Positioning System", Proceedings of the 11th USENIX Symposium on Networked Systems Design and Implementation (NSDI '14), Apr. 2, 2014, pp. 331-343, USENIX Association.

Kahn, J. et al., "Wireless Infrared Communications", Proceedings of the IEEE, vol. 85 No. 2, Feb. 1, 1997, pp. 265-298, IEEE.

* cited by examiner

DETERMINING A CHANNEL ESTIMATE

TECHNICAL FIELD

The present disclosure relates to determining a channel estimate, for example of an optical communications channel.

BACKGROUND

Light Communication (VLC), such as for example communication over an optical communications channel, may be used for wireless communication. In some examples of Light Communication (LC), such as for example Visible Light Communication (VLC), binary data is communicated using rapidly varying levels of light intensity. In more detail, one or multiple Light Emitting Diode (LEDs) may be deployed in the transmitting source in order to modulate binary data using different levels of emitted light intensity. The deployed LEDs in some examples may change the levels of the emitted light intensity in rates that are not perceivable by the human eye. The receiving end detects the changes of the emitted light intensity using one or more Photo Detectors (PDs). In this way, the receiver is able to detect the transmitted data.

SUMMARY

One aspect of the present disclosure provides a method of determining a channel estimate of an optical communications channel between at least one optical transmitting component and at least one optical receiving component. The method comprises determining a location of at least one optical transmitting component, determining an orientation of the at least one optical transmitting component, determining a transmission characteristic of the at least one optical transmitting component, determining a location of at least one optical receiving component, determining an orientation of the at least one optical receiving component, and determining a reception characteristic of the at least one optical receiving component. The method also comprises calculating the channel estimate of the optical communications channel based on the location of the at least one optical transmitting component, the orientation of the at least one optical transmitting component, the transmission characteristic of the at least one optical transmitting component, the location of the at least one optical receiving component, the orientation of the at least one optical receiving component and the reception characteristic of at least one optical receiving component.

Another aspect of the present disclosure provides apparatus for determining a channel estimate of an optical communications channel between at least one optical transmitting component and at least one optical receiving component. The apparatus comprises a processor and a memory. The memory contains instructions executable by the processor such that the apparatus is operable to determine a location of at least one optical transmitting component, determine an orientation of the at least one optical transmitting component, determine a transmission characteristic of the at least one optical transmitting component, determine a location of at least one optical receiving component, determine an orientation of the at least one optical receiving component, determine a reception characteristic of the at least one optical receiving component, and calculate the channel estimate of the optical communications channel based on the location of the at least one optical transmitting component, the orientation of the at least one optical transmitting component, the transmission characteristic of the at least one optical transmitting component, the location of the at least one optical receiving component, the orientation of the at least one optical receiving component and the reception characteristic of at least one optical receiving component.

A further aspect of the present disclosure provides apparatus for determining a channel estimate of an optical communications channel between at least one optical transmitting component and at least one optical receiving component. The apparatus is configured to determine a location of at least one optical transmitting component, determine an orientation of the at least one optical transmitting component, determine a transmission characteristic of the at least one optical transmitting component, determine a location of at least one optical receiving component, determine an orientation of the at least one optical receiving component, and determine a reception characteristic of the at least one optical receiving component. The apparatus is also configured to calculate the channel estimate of the optical communications channel based on the location of the at least one optical transmitting component, the orientation of the at least one optical transmitting component, the transmission characteristic of the at least one optical transmitting component, the location of the at least one optical receiving component, the orientation of the at least one optical receiving component and the reception characteristic of at least one optical receiving component.

A still further aspect of the present disclosure provides apparatus for determining a channel estimate of an optical communications channel between at least one optical transmitting component and at least one optical receiving component. The apparatus comprises a first determining module configured to determine a location of at least one optical transmitting component, a second determining module configured to determine an orientation of the at least one optical transmitting component, a third determining module configured to determine a transmission characteristic of the at least one optical transmitting component, a fourth determining module configured to determine a location of at least one optical receiving component, a fifth determining module configured to determine an orientation of the at least one optical receiving component, and a sixth determining module configured to determine a reception characteristic of the at least one optical receiving component. The apparatus also comprises a calculation module configured to calculate the channel estimate of the optical communications channel based on the location of the at least one optical transmitting component, the orientation of the at least one optical transmitting component, the transmission characteristic of the at least one optical transmitting component, the location of the at least one optical receiving component, the orientation of the at least one optical receiving component and the reception characteristic of at least one optical receiving component.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
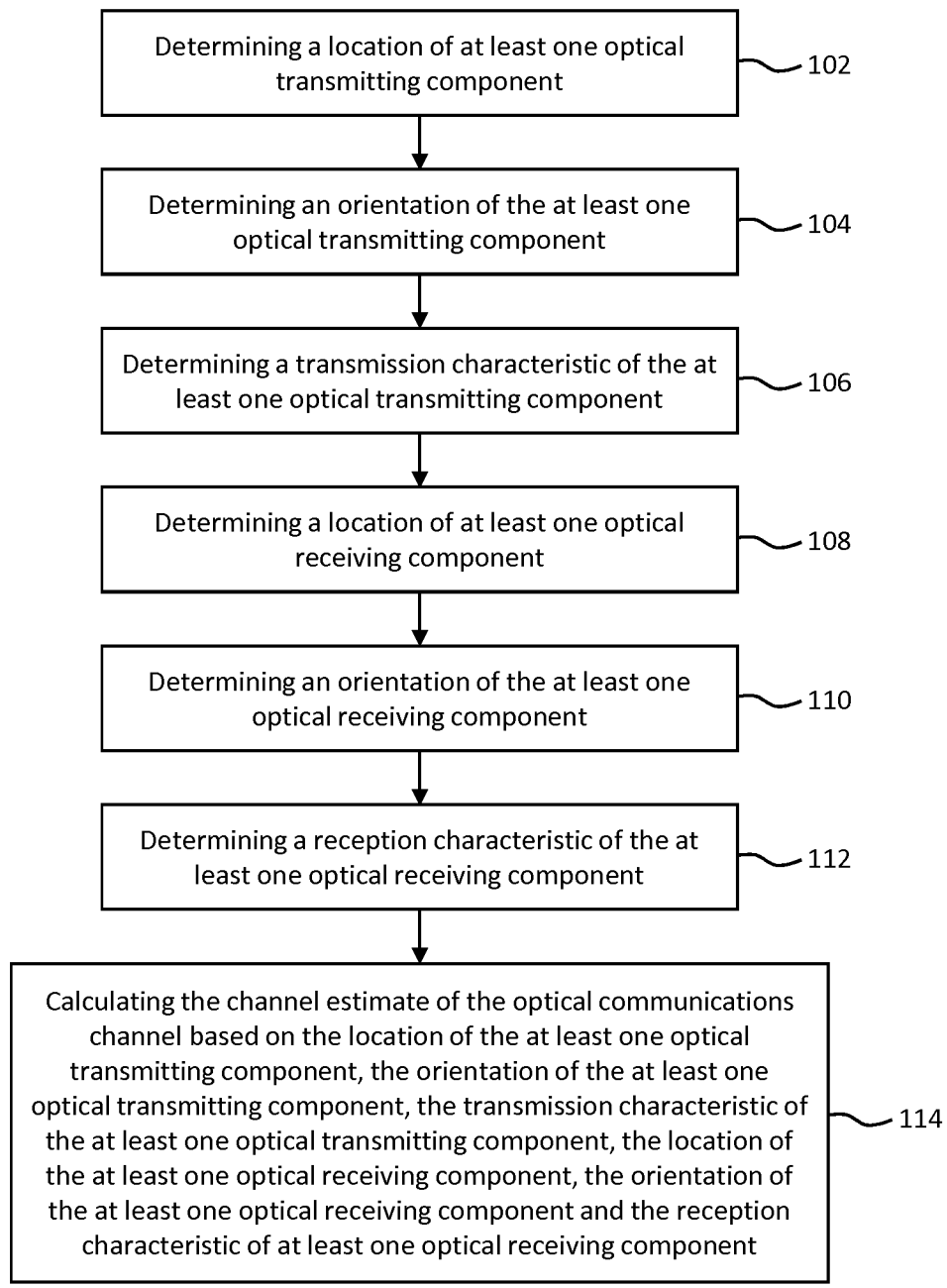
FIG. 1 is a flow chart of an example of a method of determining a channel estimate of an optical communications channel.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

In some systems, the detection process in a LC receiver may require the knowledge of the communications channel, H. This may be the case both for single and multi-carrier OFDM-based communication. Similar to RF communication, this knowledge may be provided to the receiver by using a training process. For example, prior to a data transmission, the transmitter emits a known training sequence to the receiver, from which channel knowledge can be derived at the receiver. In some examples, such as in case of block-based transmission, the training sequence can also be mixed or multiplexed with the transmitted data. However, temporal and frequency resources need to be dedicated to the transmission of a training sequence. Also, in an OFDM-based LC system, the obtained estimate of H is further distorted by the necessary steps required for the formation of an optical OFDM-based modulation scheme after the use of the Inverse Fast Fourier Transform (IFFT) or Inverse Discrete Fourier Transform in the transmitter. An example is the addition of a DC bias at the transmitter after the use of IFFT in a DC biased optical OFDM (DCO-OFDM) system.

In some examples disclosed herein, channel knowledge (e.g. a channel estimate) of an optical communications channel may be obtained by methods other than using a training sequence. For example, channel knowledge may be obtained from the location, orientation and transmission characteristic of at least one optical transmitting component (e.g. Light Emitting Diodes, LEDs), and the location, orientation and transmission characteristic of at least one optical receiving component (e.g. Photodetectors, PDs). In some examples, this information of the transmitting and receiving components may be determined and/or received using a communications channel other than the optical communications channel, such as for example another optical communications channel or a RF communications channel.

FIG. 1 is a flow chart of an example of a method 100 of determining a channel estimate of an optical communications channel between at least one optical transmitting component and at least one optical receiving component. In some examples, the method 100 may be carried out by a receiver in a LC system, although the method 100 may in other examples be carried out by any component and the channel estimate conveyed to the receiver. The method 100 comprises, in step 102, determining a location of at least one optical transmitting component, in step 104, determining an orientation of the at least one optical transmitting component, and in step 106, determining a transmission characteristic of the at least one optical transmitting component.

In some examples, the transmission characteristic may comprise or include the semi-angle and/or the frequency response of the at least one optical transmitting component. In some examples, where there are two or more optical transmitting components, the transmission characteristics of the optical transmitting components may be the same or substantially the same, and hence may for example be determined once for all optical transmitting components. In other examples, the transmission characteristics may vary between optical transmitting components, in which case the transmission characteristics of all of the optical transmitting components may be determined.

The method 100 also comprises, in step 108, determining a location of at least one optical receiving component, in step 110, determining an orientation of the at least one optical receiving component, and in step 112, determining a reception characteristic of the at least one optical receiving component. In some examples, the reception characteristic may comprise the Field of View (FOV), the frequency response and/or the responsivity of the at least one optical receiving component. In some examples, where there are two or more optical receiving components, the reception characteristics of the optical receiving components may be the same or substantially the same, and hence may for example be determined once for all optical receiving components. In other examples, the reception characteristics may vary between optical receiving components, in which case the reception characteristics of all of the optical receiving components may be determined.

In some examples, the transmitter and/or receiver may include components for determining the locations and/or orientations of the optical transmitting and/or receiving components. For example, a transmitter may include a positioning system (e.g. GPS or other positioning system) and/or an orientation determining system (e.g. orientation sensor or accelerometer) and use knowledge of the dimensions and/or geometry of the transmitter and placement of the optical transmitting component(s) within the transmitter to determine the location and/or orientation of the optical transmitting component(s). Additionally or alternatively, for example, the receiver may determine the location and/or orientation of the optical receiving component(s) in a similar manner. In some examples, the transmitter and/or receiver may be fixed in position. In these cases, the positon and orientation of the transmitter and/or receiver and/or the associated optical components may be predetermined (e.g. pre-programmed or measured previously).

The method 100 also includes, in step 114, calculating the channel estimate of the optical communications channel based on the location of the at least one optical transmitting component, the orientation of the at least one optical transmitting component, the transmission characteristic of the at least one optical transmitting component, the location of the at least one optical receiving component, the orientation of the at least one optical receiving component and the reception characteristic of at least one optical receiving component. Hence, for example, the channel estimate may be determined without using a training sequence, and in some examples may be determined without transmitting any information or signals using the optical communications channel.

An example of mathematics underpinning the calculation of the channel estimate will now be described, though in other examples the channel estimate may be calculated using any suitable method. An example point-to-point LC system may include $N_t$ transmitting Light Emitting Diodes (LEDs) and $N_r$ receiving Photodetectors (PDs), where $N_t \geq 1$ and $N_r \geq 1$. LEDs and PDs are used as examples, whereas in other examples any optical transmitting and receiving components may be used. In the following examples, it is assumed that the LEDs have the same transmission characteristics and the PDs have the same reception characteristics, though in other examples the characteristics may vary between LEDs and/or PDs. The optical channel, in the time domain, between the i-th PD, i=1, ..., $N_r$, and the j-th LED, j=1, ..., $N_t$ may be given as:

$$h_{i,j}(t) = h_{i,j}^{LOS} + h_{i,j}^{NLOS}(t), \qquad (1)$$

where, $h_{i,j}^{LOS}$, represents the Line-of-Sight (LoS) component, and $h_{i,j}^{NLOS}(t)$, represents the diffuse component. The LoS component $h_{i,j}^{LOS}$ may also be referred to in some examples as the Direct Current (DC) component. The diffuse component $h_{i,j}^{NLOS}(t)$ is the aggregate result of multiple light reflections from the surrounding surfaces. In equation (1), $h_{i,j}^{LOS}$ represents the LOS optical gain, which is given as:

$$h_{i,j}^{LOS} = \begin{cases} \dfrac{A(k+1)}{2\pi d_{i,j}^2} \cos^k(\phi_{i,j})\cos(\psi_{i,j}), & 0 \leq \psi_{i,j} \leq \Psi_{\frac{1}{2}} \\ 0, & \psi_{i,j} \geq \Psi_{\frac{1}{2}}, \end{cases} \qquad (2)$$

where A represents the area of each PD and k is the Lambertian factor which denotes the directionality order. The Lambertian factor k is given as:

$$k = -\dfrac{\ln(2)}{\ln\left(\cos\left(\Phi_{\frac{1}{2}}\right)\right)} \qquad (3)$$

with $\Phi_{1/2}$ being the transmitter semi-angle. Furthermore, d is the distance between the i-th PD and the j-th LED. The angles $\phi_{i,j}$ and $\psi_{i,k}$ denote the angle of emission of the j-th LED to the i-th PD with respect to the transmitter plane and the angle of incidence of the light at the i-th PD from the j-th LED with respect to the orthonormal vector of the receiver plane of the i-th PD, respectively. The Field of View (FOV) semi-angle of each PD is denoted as $\Psi_{1/2}$. Given that the LEDs and PDs are placed in a three-dimensional space, their spatial positions can be described by their Cartesian coordinates. Thus, the angle $\phi_{i,j}$ and $\psi_{i,j}$ can be computed as:

$$\phi_{i,j} = \arccos\left(\dfrac{dot(o_t^j, p_r^i - p_t^j)}{d_{i,j}}\right), \qquad (4)$$

and:

$$\psi_{i,j} = \arccos\left(\dfrac{dot(o_r^i, p_t^j - p_r^i)}{d_{i,j}}\right). \qquad (5)$$

In (4) and (5), $dot(x,y) = x^T y$ represents the inner product between the vectors x and y. Also, $p_t^j$ and $p_r^i$ are 3×1 vectors which represent the Cartesian coordinates of the j-th LED, j=1, ..., $N_t$, and i-th PD, i=1, ..., $N_r$, respectively. The orientation of the j-th LED, j=1, ..., $N_t$, is given from the 3×1 orthonormal vector $o_t^j$, which may be vertical to the plane of the LED. Similarly, the orthonormal vector $o_r^i$, which may be vertical to the plane of the i-th PD, represents the orientation of the i-th PD. Finally, the distance $d_{i,j}$ between the i-th PD and the j-th LED can be computed as:

$$d_{i,j} = \|p_r^i - p_t^j\|_2, \qquad (6)$$

where, $\|\cdot\|_2$, is the Euclidean norm. In example indoor LC scenarios, most of the optical signal energy (e.g. at least 95%) may be included in the LOS component. Therefore, in some examples, the diffuse component $h_{i,j}^{NLOS}(t)$, can be neglected. As a result:

$$h_{i,j}(t) \approx h_{i,j}^{LOS} \qquad (7)$$

Even though available optical bandwidth may be large, LC communication may in some examples be bandwidth limited due to the frequency selective nature of the LEDs. For example, each LED may behave like a lowpass filter with a frequency response $H_{LED}(f)$. In some examples, the specific form of the frequency response of an LED, $H_{LED}(f)$, may depend at least in part on the specific type of LED (e.g. blue or white). Thus, in some examples, the frequency response may be given in the form of specifications from the manufacturer, or obtained via experimental measurements. Note that in some examples $H_{LED}(f)$ does not depend on the specific positions (e.g. location and/or orientation) of the deployed LEDs and PDs. Considering the approximation of the optical channel in equation (7) and the frequency response of the LED, $H_{LED}(f)$, the composite LC channel, which includes both the LED and the actual physical optical channel, may be expressed (approximated) as:

$$H_{i,j}^{LC}(f) \approx h_{i,j}^{LOS} H_{LED}(f). \qquad (8)$$

Note that, here, without loss of generality, it is indirectly assumed that all LEDs have the same frequency response. If this is not the case, additional indices can be used in (8) for denoting the different frequency responses of each LED.

Provided that Inter-Symbol Interference (ISI) is avoided or can be neglected, e.g. due to the selected transmission rate, the system equation of a single carrier MIMO LC system may be expressed as:

$$y = rH_{LED}(f)Hx + w. \qquad (9)$$

In (9), the $N_r \times 1$ received signal vector is expressed as y; the responsivity of the PD, in A/W, is denoted by r; H is a $N_r \times N_t$ matrix which denotes the optical physical MIMO channel; the (i,j) element of H, i=1, ..., $N_r$, and, j=1, ..., $N_t$, is given by (2); x is the $N_t \times 1$ transmitted optical signal vector; the elements of x depend from the deployed MIMO transmission scheme and the used constellation for optically modulating binary data; finally, w is a $N_r \times 1$ vector which represents the composite effect of ambient shot noise and thermal noise.

Due to the nature of the optical channel, the optical channel supports the transmission of real and non-negative signals. An example technique for creating real signals from complex signals uses the Inverse Fast Fourier Transform (IFFT) combined with its Hermitian symmetry in the frequency domain. This creates real signals, which can be negative or positive, by sacrificing half of the available subcarriers. As the resulting signals may still be negative or positive (bipolar), they need to be represented or approximated in a positive form (unipolar). This is achieved for example in DCO-OFDM which introduces a DC bias to the resulting bipolar signals combined with clipping for removing the large values. Example schemes aim to create a number of orthogonal sub-carriers which form flat channels. Irrespective of the modulation scheme, e.g. optical OFDM-based modulation scheme, the k-th sub-carrier can be described mathematically as:

$$y_k = rH_{LED}(f_k)Hx_k + w_k, \quad (10)$$

k=1 . . . , N, after applying the IFFT and the appropriate representation processing. The processing depends from the specific optical OFDM-based scheme. Here, N is the number of sub-carriers. Note that the previous equation holds for example as long as any form of linear and non-linear distortion, such as clipping for DCO-OFDM, is ignored.

Observing (9) for single-carrier transmission and (10) for multi-carrier transmission, it can be concluded that the detection of the transmitted signal vectors x and $x_k$ in single-carrier and multi-carrier transmission, respectively, may use the knowledge of, $H_{LED}(\cdot)$, and H in the receiver. r is the responsivity of the PD(s) and $H_{LED}(\cdot)$ is the frequency response of the deployed LED(s). Therefore, in some examples, these values solely depend on the specifications of the used components. Thus, in some examples, these may be known from the transceiver. In contrast, H, which may in some examples incorporate the DC component of the MIMO LC channel, may be spatially dependent and thus unknown at the receiver.

An example hybrid RF and LC network is considered. For example, a number of Access Points (APs) are employed for providing wireless coverage to a number of Stations (STAs). Note that the APs and STAs could also in other examples be gNodeBs and UEs, respectively. The APs are able to transmit and receive RF signals, and include one or more LEDs for acting as LC transmitters. The STAs can receive and transmit RF signals, and include one or more PDs for the reception of optical signals. The STAs may or may not be able to transmit optical signals using LEDs. It is assumed that the network uses a common Cartesian coordinate system representation. In other examples, it could be assumed that each AP and the STAs use their own coordinate system.

Considering a single AP-STA link, the AP can determine its spatial position (location) and the spatial position of the STA for example using the positioning service offered by the RF sub-network. Note that any other technique for determining location, such as visual positioning using cameras, can be used in addition or as an alternative. Therefore, the AP is able to calculate the spatial position of its j-th LED, $p_t^j$, and the spatial position, $p_r^i$, of the i-th PD of the STA. Also, given that the AP knows the orientations of its LED(s) $o_t^j$, j=1, . . . , $N_t$, and the orientation of the PD(s) of the STA, $o_r^i$, i=1, . . . , $N_r$, (e.g. determined from the position, orientation and dimensions/geometry of the STA), it can calculate the angles $\phi_{i,j}$ and $\psi_{i,j}$ using (4) and (5), for, i=1, . . . , $N_r$, and, j=1, . . . , $N_t$. In some examples, the spatial position of an AP and its orientation are fixed and remain the same for long periods of time. Thus, this information may be pre-programmed or measured previously for example. However, in some examples, STAs are expected to be mobile. Thus, their position may be determined for example from positioning services, such as for example RF positioning services. Furthermore, the orientation of the PD(s) of the STA can be acquired in some examples using sensors of the STA, such as one or more accelerometers and/or orientation sensors. Once the positon and/or orientation of the STA and/or the or each PD is obtained in the STA, these can be sent to the AP, for example using an RF link. Given that the optical specifications, A, r, $\Psi_{1/2}$, $\Phi_{1/2}$, and $H_{LED}(\cdot)$, of the LEDs and PDs are known to the AP, the channel estimate of the optical channel between the i-th PD and the j-th LED can be calculated, for example using equation (8) above.

In a similar fashion, the optical channel between the i-th PD and the j-th LED is acquired by the STA. The STA can measure or estimate its position in the coordinate system using the RF positioning system, which uses for example a RF signal transmitted from the RF sub-network. Other positioning systems can be used in addition or as an alternative, such as for example a visual positioning system. The STA can then calculate the position of its PD(s), $p_r^i$, i=1, . . . , $N_r$, using the position and other information such as the dimensions/geometry of the STA. Additionally, the orientation, $o_r^i$, of its PDs can be obtained, for example using information from its sensors. The position of the transmitter LED(s) $p_t^j$, j=1, . . . , $N_t$, and their orientation, $o_t^j$, become known to the STA by being transmitted by the involved AP. In the STA, given that the optical specification of the PDs and the optical specifications of the LED are known, and based on the knowledge of the previous spatial information, the calculation of the optical channel between the i-th PD and the j-th LED can be directly done. The previous calculation can be done using (8).

In some examples, the AP may use the channel estimate for various purposes. For example, the AP may send the channel estimate to the STA for use by the STA. Additionally or alternatively, the AP may use the channel estimate in association with received signals, for example to assist demodulation, and/or to apply certain signal processing techniques such as precoding to signals transmitted to STAs.

Referring back to the method 100 shown in FIG. 1, in some examples of the method 100, at least one of the location of the at least one optical transmitting component, the orientation of the at least one optical transmitting component, the transmission characteristic of the at least one optical transmitting component, the location of the at least one optical receiving component, the orientation of the at least one optical receiving component and the reception characteristic of at least one optical receiving component is received over a wireless communications channel other than the optical communications channel. Therefore, information that is used to calculate the channel estimate of the optical communications channel may not be sent using the optical communications channel. In some examples, the other channel comprises a radio frequency (RF) communications channel or a further optical communications channel. In some examples, the information that is used to calculate the channel estimate of the optical communications channel may be sent using the same optical communications channel.

In some examples, the method 100 comprises receiving the location of the at least one optical transmitting component, the orientation of the at least one optical transmitting component and the transmission characteristic of the at least one optical transmitting component. The method 100 may therefore in some examples be carried out by a receiver comprising the at least one optical receiving component. The method 100 may comprise calculating a $N_r \times 1$ received signal vector $y = H_{LED}(f)RHx + w$, wherein $N_t$ is the number of the at least one optical transmitting component; $N_r$ is the number of the at least one optical receiving component; R is a diagonal matrix in which the i-th diagonal element comprises the responsivity $r_i$ of the ith optical receiving component of the at least one optical receiving component; $H_{LED}(f)$ comprises the transmission characteristic of the at least one optical transmitting component; H is a $N_r \times N_t$ matrix indicating the channel estimate of the optical communications channel; x comprises a $N_t \times 1$ vector representing a transmitted signal; and w comprises a $N_r \times 1$ vector indicating interference and/or noise. In these examples, the optical receiving components may have different reception characteristics, e.g. responsivities. $H_{LED}(f)$ may comprise a frequency response of the at least one optical transmitting component. H may be a $N_r \times N_t$ matrix indicating the channel estimate of the optical communications channel.

In some examples, element (i,j) of H, i=1, ..., $N_r$, j=1, ..., $N_t$, comprises:

$$h_{i,j}^{LOS} = \begin{cases} \frac{A(k+1)}{2\pi d_{i,j}^2} \cos^k(\phi_{i,j})\cos(\psi_{i,j}), & 0 \leq \psi_{i,j} \leq \Psi_{\frac{1}{2}} \\ 0, & \psi_{i,j} \geq \Psi_{\frac{1}{2}}, \end{cases} \quad (11)$$

wherein A comprises the area of each optical receiving component, and:

$$k = -\frac{\ln(2)}{\ln\left(\cos\left(\Phi_{\frac{1}{2}}\right)\right)} \quad (12)$$

wherein $\Phi_{1/2}$ comprises semi-angle of the at least one optical transmitting component, d comprises the distance between the i-th optical receiving component and the j-th optical transmitting component, $\phi_{i,j}$ comprises an angle of emission of the j-th optical transmitting component to the i-th optical receiving component with respect to the transmitter plane, $\psi_{i,j}$ comprises the angle of incidence of a signal received at the i-th optical receiving component from the j-th optical transmitting component with respect to the orthonormal vector of the receiver plane of the i-th optical receiving component, and $\Psi_{1/2}$ comprises a Field of View (FOV) semi-angle of each optical receiving component.

In some examples:

$$\phi_{i,j} = \arccos\left(\frac{dot(o_t^j, p_r^i - p_t^j)}{d_{i,j}}\right) \quad (13)$$

and $$\psi_{i,j} = \arccos\left(\frac{dot(o_r^i, p_t^j - p_r^i)}{d_{i,j}}\right) \quad (14)$$

wherein $dot(x,y)=x^T y$, $p_t^j$ comprises coordinates of the j-th optical transmitting component, $p_r^i$ comprises coordinates of the i-th optical receiving component, $o_t^j$ comprises a 3×1 orthonormal vector indicating the orientation of the j-th optical transmitting component, $o_r^i$ comprises a 3×1 orthonormal vector indicating an orientation of the i-th optical receiving component.

In some examples, the method 100 comprises receiving the location of the at least one optical receiving component, the orientation of the at least one optical receiving component and the reception characteristic of at least one optical receiving component. Therefore, the method 100 may in some examples be carried out by a transmitter comprising the at least one optical transmitting component. Therefore, the transmitter can in some examples adjust a transmission characteristic of a signal transmitted on the optical communications channel based on the channel estimate.

In some examples, the characteristic of the at least one optical transmitting component comprises a frequency response of the at least one optical transmitting component and/or a semi-angle of the at least one optical transmitting component. Additionally or alternatively, in some examples, the characteristic of the at least one optical receiving component comprises an area of the at least one optical receiving component, a responsivity of the at least one optical receiving component, a field of view of the at least one optical receiving component and/or a semi-angle of the at least one optical receiving component. The characteristics may vary between optical components or may be the same, e.g. for all optical transmitting components or all optical receiving components.

Figure 2:
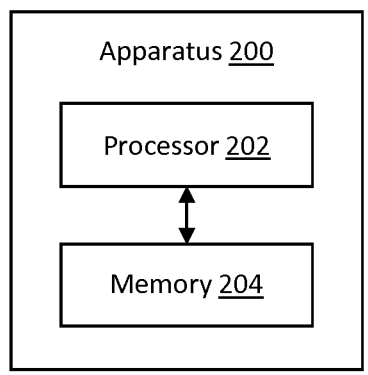
FIG. 2 is a schematic of an example of apparatus for determining a channel estimate of an optical communications channel.

FIG. 2 is a schematic of an example of apparatus 200 for determining a channel estimate of an optical communications channel between at least one optical transmitting component and at least one optical receiving component. The apparatus 200 comprises a processor 202 and a memory 204. The memory 204 contains instructions executable by the processor 202 such that the apparatus 200 is operable to determine a location of at least one optical transmitting component, determine an orientation of the at least one optical transmitting component, determine a transmission characteristic of the at least one optical transmitting component, determine a location of at least one optical receiving component, determine an orientation of the at least one optical receiving component, determine a reception characteristic of the at least one optical receiving component, and calculate the channel estimate of the optical communications channel based on the location of the at least one optical transmitting component, the orientation of the at least one optical transmitting component, the transmission characteristic of the at least one optical transmitting component, the location of the at least one optical receiving component, the orientation of the at least one optical receiving component and the reception characteristic of at least one optical receiving component.

Figure 3:
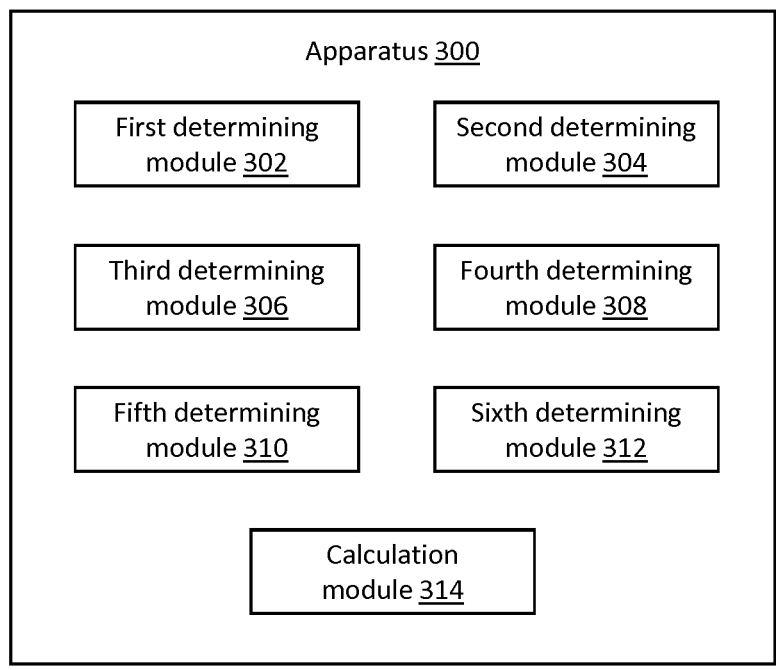
FIG. 3 is a schematic of an example of apparatus for determining a channel estimate of an optical communications channel.

FIG. 3 is a schematic of an example of apparatus 300 for determining a channel estimate of an optical communications channel between at least one optical transmitting component and at least one optical receiving component. The apparatus 300 comprises a first determining module 302 configured to determine a location of at least one optical transmitting component, a second determining module 304 configured to determine an orientation of the at least one optical transmitting component, and a third determining module 306 configured to determine a transmission characteristic of the at least one optical transmitting component. The apparatus also comprises a fourth determining module 308 configured to determine a location of at least one optical receiving component, a fifth determining module 310 configured to determine an orientation of the at least one optical receiving component, and a sixth determining module 312 configured to determine a reception characteristic of the at least one optical receiving component. The apparatus 300 further comprises a calculation module 314 configured to calculate the channel estimate of the optical communications channel based on the location of the at least one optical transmitting component, the orientation of the at least one optical transmitting component, the transmission characteristic of the at least one optical transmitting component, the location of the at least one optical receiving component, the orientation of the at least one optical receiving component and the reception characteristic of at least one optical receiving component.

Some examples of the present disclosure have the advantage that transmission of training sequences from the transmitter to the receiver over the optical communications channel is avoided or at least reduced. Therefore, resources in the optical communication channel can be used for communication purposes instead of channel estimation. This may be particularly useful in example scenarios with high mobility, where the optical communications channel is expected to undergo frequent changes, for example due to movement of the receiver.

Additionally, in some examples, at least some of the information that may be used for calculating the channel using equation (8) above may be obtained from already existing components, such as for example components or sensors in the transmitter or receiver or as features of the network. Thus, some examples may be incorporated in an existing network or system.

Some examples of the present disclosure have the advantage that both the transmitter and the receiver may be able to determine the channel estimation without increasing significantly the required overhead (e.g. communication overhead in the optical communications channel). This may in some examples enable the use of closed loop signal processing techniques which may improve communication quality. In a system that uses a training process, a training sequence may be used in both link directions. However, in examples of the present disclosure, positioning (e.g. location and/or orientation) and/or specification information (e.g. optical component characteristics) may be exchanged between the link end devices, for example using RF signals. The volume of this information may in some examples be significantly less than the communication resources required for transmitting training sequences in both link directions.

Furthermore, in some examples, a transmitter or receiver may determine a channel estimation of the optical communications channel which is not distorted by the processing that is required for the formation of an optical OFDM-based scheme such as DCO-OFDM. For example, in the case of DCO-OFDM, this distortion may be the effect of DC biasing after the application of the IFFT in the transmitter and clipping of values of the biased signal where they are higher than the supported values (e.g. maximum value of optical transmission intensity).

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of determining a channel estimate of a wireless optical communications channel between at least one optical transmitting component and at least one optical receiving component, the method comprising:
   determining a location of the at least one optical transmitting component;
   determining an orientation of the at least one optical transmitting component;
   determining a transmission characteristic of the at least one optical transmitting component;
   determining a location of the at least one optical receiving component;
   determining an orientation of the at least one optical receiving component;
   determining a reception characteristic of the at least one optical receiving component; and
   calculating the channel estimate of the wireless optical communications channel based on the location of the at least one optical transmitting component, the orientation of the at least one optical transmitting component, the transmission characteristic of the at least one optical transmitting component, the location of the at least one optical receiving component, the orientation of the at least one optical receiving component, and the reception characteristic of at least one optical receiving component;
   wherein the method comprises:
      receiving the location of the at least one optical transmitting component, the orientation of the at least one optical transmitting component, and the transmission characteristic of the at least one optical transmitting component; and/or
      receiving the location of the at least one optical receiving component, the orientation of the at least one optical receiving component, and the reception characteristic of at least one optical receiving component.

2. The method of claim 1, wherein at least one of the location of the at least one optical transmitting component, the orientation of the at least one optical transmitting component, the transmission characteristic of the at least one optical transmitting component, the location of the at least one optical receiving component, the orientation of the at least one optical receiving component, and the reception characteristic of at least one optical receiving component is received over a wireless communications channel other than the wireless optical communications channel.

3. The method of claim 2, wherein the wireless communications channel comprises a radio frequency (RF) communications channel or a further wireless optical communications channel.

4. The method of claim 1:
   wherein the method is carried out by a receiver comprising the at least one optical receiving component; and
   wherein the method comprises receiving the location of the at least one optical transmitting component, the orientation of the at least one optical transmitting component, and the transmission characteristic of the at least one optical transmitting component.

5. The method of claim 4, wherein:
   the method comprises calculating a $N_r \times 1$ received signal vector $y = H_{LED}(f)RHx + w$;

$N_t$ is the number of the at least one optical transmitting component;

$N_r$ is the number of the at least one optical receiving component;

R is a diagonal matrix in which the i-th diagonal element comprises the responsivity r, of the ith optical receiving component of the at least one optical receiving component;

$H_{LED}(f)$ comprises the transmission characteristic of the at least one optical transmitting component;

H is a $N_r \times N_t$ matrix indicating the channel estimate of the wireless optical communications channel;

x comprises a $N_t \times 1$ vector representing a transmitted signal; and w comprises a $N_r \times 1$ vector indicating interference and/or noise.

6. The method of claim 5, wherein $H_{LED}(f)$ comprises a frequency response of the at least one optical transmitting component.

7. The method of claim 5, wherein element (i,j) of H, i=1, ..., $N_r$, j=1, ..., $N_t$, comprises:

$$h_{i,j}^{LOS} = \begin{cases} \frac{A(k+1)}{2\pi d_{i,j}^2} \cos^k(\phi_{i,j})\cos(\psi_{i,j}), & 0 \le \psi_{i,j} \le \Psi_{\frac{1}{2}}, \\ 0, & \psi_{i,j} \ge \Psi_{\frac{1}{2}}, \end{cases}$$

wherein A comprises the area of each optical receiving component, and:

$$k = -\frac{\ln(2)}{\ln(\cos(\Phi_{\frac{1}{2}}))}, \quad (2)$$

wherein $\Phi_{1/2}$ comprises semi-angle of the at least one optical transmitting component, d comprises the distance between the i-th optical receiving component and the j-th optical transmitting component, $\phi_{i,j}$ comprises an angle of emission of the j-th optical transmitting component to the i-th optical receiving component with respect to the transmitter plane, $\psi_{i,j}$ comprises the angle of incidence of a signal received at the i-th optical receiving component from the j-th optical transmitting component with respect to the orthonormal vector of the receiver plane of the i-th optical receiving component, and $\Psi_{1/2}$ comprises a Field of View (FOV) semi-angle of each optical receiving component.

8. The method of claim 7, wherein:

$$\phi_{i,j} = \arccos\left(\frac{dot(o_t^j, p_r^i - p_t^j)}{d_{i,j}}\right),$$

and $$\psi_{i,j} = \arccos\left(\frac{dot(o_r^i, p_t^j - p_r^i)}{d_{i,j}}\right),$$

wherein $dot(x,y)=x^T y$, $p_t^j$ comprises coordinates of the j-th optical transmitting component, $p_r^i$ comprises coordinates of the i-th optical receiving component, $o_t^j$ comprises a 3×1 orthonormal vector indicating the orientation of the j-th optical transmitting component, $o_r^i$ comprises a 3×1 orthonormal vector indicating an orientation of the i-th optical receiving component.

9. The method of claim 1:
wherein the method is carried out by a transmitter comprising the at least one optical transmitting component; and
the method comprises receiving the location of the at least one optical receiving component, the orientation of the at least one optical receiving component, and the reception characteristic of at least one optical receiving component.

10. The method of claim 9, wherein the method comprises adjusting a transmission characteristic of a signal transmitted on the wireless optical communications channel based on the channel estimate.

11. The method of claim 1, wherein the characteristic of the at least one optical transmitting component comprises a frequency response of the at least one optical transmitting component and/or a semi-angle of the at least one optical transmitting component.

12. The method of claim 1, wherein the characteristic of the at least one optical receiving component comprises an area of the at least one optical receiving component, a responsivity of the at least one optical receiving component and/or a semi-angle of the at least one optical receiving component.

13. The method of claim 1, wherein:
the at least one optical transmitting component comprises at least one light emitting diode (LED); and/or
the at least one optical receiving component comprises at least one photodetector.

14. A non-transitory computer readable recording medium storing a computer program product for determining a channel estimate of a wireless optical communications channel between at least one optical transmitting component and at least one optical receiving component, the computer program product comprising program instructions which, when run on processing circuitry, causes the processing circuitry to:
determine a location of the at least one optical transmitting component;
determine an orientation of the at least one optical transmitting component;
determine a transmission characteristic of the at least one optical transmitting component;
determine a location of the at least one optical receiving component;
determine an orientation of the at least one optical receiving component;
determine a reception characteristic of the at least one optical receiving component; and
calculate the channel estimate of the wireless optical communications channel based on the location of the at least one optical transmitting component, the orientation of the at least one optical transmitting component, the transmission characteristic of the at least one optical transmitting component, the location of the at least one optical receiving component, the orientation of the at least one optical receiving component, and the reception characteristic of at least one optical receiving component;
wherein the method comprises:
receive the location of the at least one optical transmitting component, the orientation of the at least one optical transmitting component, and the transmission characteristic of the at least one optical transmitting component; and/or receive the location of the at least one optical receiving component, the orientation of the at least one optical receiving component, and the reception characteristic of at least one optical receiving component.

15. An apparatus for determining a channel estimate of a wireless optical communications channel between at least one optical transmitting component and at least one optical receiving component, the apparatus comprising:
processing circuitry;
memory containing instructions executable by the processing circuitry whereby the apparatus is operative to:
determine a location of at least one optical transmitting component;
determine an orientation of the at least one optical transmitting component;
determine a transmission characteristic of the at least one optical transmitting component;
determine a location of at least one optical receiving component;
determine an orientation of the at least one optical receiving component;
determine a reception characteristic of the at least one optical receiving component; and
calculate the channel estimate of the wireless optical communications channel based on the location of the at least one optical transmitting component, the orientation of the at least one optical transmitting component, the transmission characteristic of the at least one optical transmitting component, the location of the at least one optical receiving component, the orientation of the at least one optical receiving component and the reception characteristic of at least one optical receiving component;
wherein the instructions are such that the apparatus is further operative to:
receive the location of the at least one optical transmitting component, the orientation of the at least one optical transmitting component, and the transmission characteristic of the at least one optical transmitting component; and/or
receive the location of the at least one optical receiving component, the orientation of the at least one optical receiving component, and the reception characteristic of at least one optical receiving component.

* * * * *

UNITED STATES PATENT AND TRADEMARK OFFICE
CERTIFICATE OF CORRECTION

| | | |
|---|---|---|
| PATENT NO. | : 11,349,562 B2 | |
| APPLICATION NO. | : 17/283097 | |
| DATED | : May 31, 2022 | |
| INVENTOR(S) | : Stavridis et al. | |

It is certified that error appears in the above-identified patent and that said Letters Patent is hereby corrected as shown below:

On the Title Page

In Item (56), under "OTHER PUBLICATIONS", in Column 2, Line 4, delete "Stevanage," and insert -- Stevenage, --, therefor.

In the Specification

In Column 5, Line 49, delete "$\Psi i,k$" and insert -- $\Psi_{i,j}$ --, therefor.

In Column 6, Line 19, in Equation (7), delete " $h_{i,j}(t) \approx h_{i,j}^{LOS}$ " and insert -- $h_{i,j}(t) \approx h_{i,j}^{LOS}.$ --, therefor.

In the Claims

In Column 13, Line 6, in Claim 5, delete "r," and insert -- $r_i$ --, therefor.

Signed and Sealed this
Eighteenth Day of October, 2022

Katherine Kelly Vidal
*Director of the United States Patent and Trademark Office*